A. J. TAYLOR.
Revolving Rake-Shoes.
No. 136,189.  Patented Feb. 25, 1873.
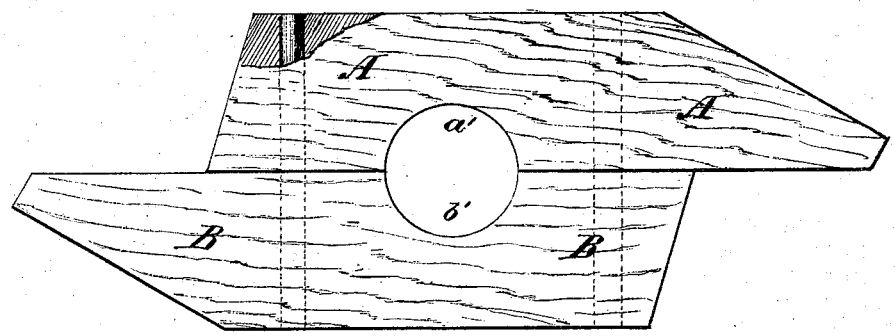
Witnesses:
P. C. Dittrick.
W. A. Graham.
Inventor:
A. J. Taylor.
Per Munn & Co.
Attorneys.

UNITED STATES PATENT OFFICE.

ALMERIN J. TAYLOR, OF ROME, PENNSYLVANIA.

IMPROVEMENT IN REVOLVING-RAKE SHOES.

Specification forming part of Letters Patent No. 136,189, dated February 25, 1873.

*To all whom it may concern:*

Be it known that I, ALMERIN J. TAYLOR, of Rome, in the county of Bradford and State of Pennsylvania, have invented a new and useful Improvement in Shoe for Revolving Hay-Rakes, of which the following is a specification:

The figure is a side view of my improved shoe, part being broken away to show the construction.

The invention consists in securing the two sections of a rake-shoe detachably, so as to bring the fulcrum directly under the rake-head, as hereinafter fully described.

The shoe is made in two parts, A B, exactly alike. The parts A B are made of three-by-four-inch (3-by-4-inch) scantling, about eighteen inches in length, and are beveled off at one end for about six or seven inches. The parts A B are placed upon each other, long side to long side, with their beveled ends pointing in opposite directions, and projecting as shown in the figure, and are securely bolted together. In the adjacent edges of the parts A B are formed half-round notches $a'$ $b'$, which, when the said parts of the shoe are bolted together, form a round hole to receive and fit upon the rounded middle part of the rake-head. The shoe A B should fit closely to the rake-head, but, at the same time, should be sufficiently loose to allow the rake-head to work in it to adjust the teeth to the surface of the ground, or to raise them to pass obstructions. The fulcrum is thus brought directly under the rake-head. By this construction, as the rake is revolved to dump the hay, the other side of the shoe will come in contact with and will slide along the surface of the ground. The shoe A B may be faced with strap-iron, if desired. It is designed to attach a single shoe, A B, to the center of the rake-head, so that the rake may be poised or balanced upon it; but more than one shoe may be used, if desired—in which case one may be larger than the others, to elevate the rake sufficiently to rake scatterings upon wheat stubble.

Having thus described my invention, I claim as new and desire to secure by Letters Patent—

The rake-shoe herein described, composed of sections A B secured together detachably, as set forth, for the purpose specified.

ALMERIN J. TAYLOR.

Witnesses:
B. L. SMITH,
MYRON OSBORN.